March 16, 1926. 1,576,733
E. FERNGREN
PROCESS OF MAKING GLASSWARE
Filed Jan. 20, 1920
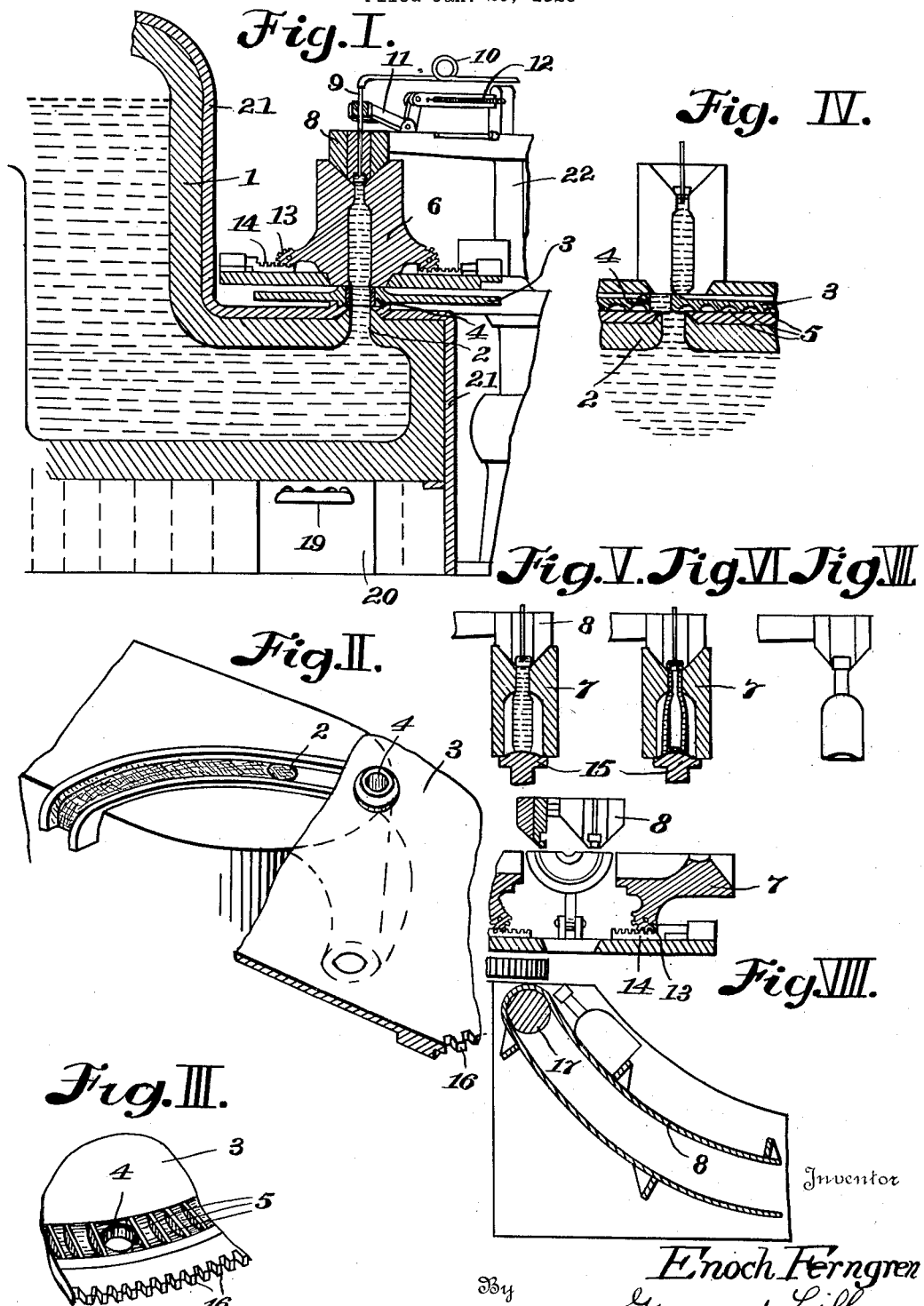
Inventor
Enoch Ferngren
By Gray and Lilly
Associate Attorneys.

Patented Mar. 16, 1926.

1,576,733

UNITED STATES PATENT OFFICE.

ENOCH FERNGREN, OF WASHINGTON, DISTRICT OF COLUMBIA.

PROCESS OF MAKING GLASSWARE.

Application filed January 20, 1920. Serial No. 352,725.

*To all whom it may concern:*

Be it known that I, ENOCH FERNGREN, a citizen of the United States, residing at Washington, in the District of Columbia, have invented a new and useful Improvement in Processes of Making Glassware, of which the following is a specification.

This invention relates to an automatic process of manufacturing hollow glassware, and may be carried out by other means than those herein described.

The apparatus features shown by the accompanying drawings are more completely illustrated and described in my Patent No. 1,328,273, January 20, 1920, granted on application, Serial No. 682,895, filed March 11, 1912, wherein such features as are distinct from this method are specifically disclosed and claimed. The method now concerned deals with matters of a divisional nature inherent in the apparatus but not heretofore defined and explained in a method and process sense.

It has been the object of many efforts in glass invention to provide means or methods whereby it would be possible to obtain gathers or charges of glass for molds in a condition of uniform fluidity to insure successful formative operation.

When the glass is manually removed from its source of supply and delivered to a mold, it is not uniformly plastic, usually consisting of or having many degrees of plasticity, and produces unsatisfactory ware. The same is true when the glass is allowed to pile up inside of a mold or upon severing means in the obtaining of a mold charge, and this produces much faulty ware.

The primary object of this invention is to provide a way whereby a mold charge may be advanced directly into a mold from the supply while in a state of uniform fluidity and thus provide a practical method wherein the quality of the finished product is improved and losses minimized; and to this end the invention principally aims to overcome the defects associated with accumulative flow gathering where the glass is caused to rest upon heat-absorbing metallic surfaces during the gathering period.

To accomplish this I cause the glass to advance from a supply or melting tank, discharge through, and issue from an outlet in a continuous fashion, and preferably in an upward direction; and while it is thus discharging, I am alternately periodically first restricting and thereafter increasing the speed and volume of the continuously issuing glass, each period of increased discharge being accompanied by increased velocity of movement, and resulting in the rapid advance from the supply into a mold cavity of a flow having practically the same cross section as the receiving cavity of the mold, specifically speaking, taking on the same lateral dimensions as the mold cavity as it proceeds upwardly therein, whereby the neck portion, or upper edge portion, is formed of glass that is of higher temperature than would be the case if the glass had received previous chilling in gathering. While the continuous issue is thus intermittently made large and rapid in the practice of this process, as will be hereinafter described, for the formation of mold charges of uniform fluid structure the restricting of the discharge which periodically takes place is accompanied by a severing action which detaches the mold charge as the movement of the glass through the outlet is reduced.

During the period that the glass is restrained in its discharge movement from the outlet, I employ means for moving away the discharged glass, successive portions of the discharged glass being separated from the issuing glass while it is moving, the division taking place directly at the edge of the outlet.

The glass thus removed is preferably collected and returned to the melting tank, taking the place of cullet in the batch.

During the discharge movement of the glass, both when restrained and released, the glass is additionally heated by a constant flow of heat units that preferably are caused to move through the glass in the direction of its discharge through the outlet.

A further object of this invention is to cut off a mold charge with severing means that move in the direction of the movement of the glass after it has issued from the outlet, thus insuring a constancy of movement at all points in the advance of the glass, both at the outlet and at the point beyond the outlet where the glass is severed.

A further object of this invention is to give the discharging glass impulses of motion, sustained by sufficient force, and thereby shape the blank portion of an article of glassware on the major portion of each increased discharge, and to effect the severance and departure from the discharging glass of the blank portion without arresting the advance movement of the discharge, or its departure from the outlet.

A further object of this invention is to form articles of glassware and to deliver each article progressively to an annealing furnace for gradual cooling.

In carrying out the process, I employ a static fluid pressure as a force of actuation for causing the discharge movement from a supply; and the relation of machine elements to this force in a regulative fashion to produce the desired result will now be briefly described, reference being had to the accompanying drawings, in which:—

Figure 1 is a fragmentary vertical section of an arrangement for carrying out the glass discharging feature of the method, showing a supply of glass under hydrostatic pressure, the outlet portion through which the glass discharges and the blank forming mold as it is charged; and also showing the orificial glass-severing means employed.

Fig. 2 is a perspective view of the glass containing portion of the severing means, but without the mold, showing the outlet and a fragmentary section of the main elements for controlling the continuous discharge.

Fig. 3 is an inverted perspective fragmentary view of the glass-discharge controlling element, showing the orificial portion that admits the glass into the mold and severs the charge.

Fig. 4 is a cross-sectional fragmentary view approximately showing the relations existing as the mold charge is severed.

Figs. 5, 6 and 7 show the progressive development of a blank charge into a bottle.

Fig. 8 is a fragmentary cross-sectional view showing the bottle in transit to the annealing oven.

Briefly described, the method of procedure with the means shown is as follows:

The upper layer of glass in a melting tank is caused to flow down into the container 1 and to discharge therefrom to the outlet 2, the pressure of the superimposed body making the movement initially speedy. For the control of this movement there is mounted for constant rotation over the outlet 2 an element 3 providing a series of orificial portions 4, as shown in Figs. 2 and 3 that are spaced equal distances apart, and which are connected by an extended cavity divided into a series of pockets 5 by a series of partitions. The control of the discharging glass is as follows: The member 3, during its movement, is advancing the pockets 5 over the outlet opening, thus receiving the glass as it issues from the outlet and moving it away therefrom while restricting the volume and velocity of the discharge to the limited clearance afforded by the moving pockets. The speed of movement of this member is relatively slow and the number of pockets as few as possible between each two adjacent orifices 4, so as not unnecessarily to waste glass. A mold composed of a neck-forming portion 8 and a blank-forming portion 6, illustrated as a blank mold in Fig. 1, is caused to be brought forward by a rotatable device and intermittently aligned with the outlet 2, and while moving into this alignment also caused to register in alignment with orifice 4 which, at this instant, is arriving into position to form an extension to the outlet portion 2, and thus form a clear passage for the advance of the glass discharge as the restraining influence of the small cavities 5 is removed and the pressure of the superimposed mass of glass in the container 1 is thus suddenly released from restraint. As the orifice 4 and therewith the adjoining bore of the mold come into full alignment with the outlet 2, there results a rapid movement manifesting as a sort of a leap of the glass through the orifice 4 into the bore of the mold, the velocity of the movement diminishing as it reaches the higher elevation of the neck-forming portion of the mold.

During the movement of the glass discharge into the mold, both the rotatable mold-carrying member and the member 3 preferably continue their movements, thus moving the orificial portion 4 gradually out of alignment with the outlet 2 and the bore of the mold more rapidly out of alignment with the orifice 4, thus progressively restricting the velocity of discharging glass by progressive obstruction; and while this takes place at the discharge opening 2, the mold 6 continues its movement, and thus as the velocity and volume of flow is restricted by the limitation of space in the mold and by the movement of orifice 4, the glass at the bottom of the mold is severed by the shearing movement of the edge of the mold across the edge of the orifice 4, while the movement of the glass from the outlet 2 is being continued and restricted, as heretofore pointed out, by the pocket 5.

The severed blank within the mold is now disengaged from the blank-forming portion 6 of the mold and is carried by the neck portion 8 while the blow mold 7 and mold bottom 15 are caused to enclose the blank. The blank or glass is now expanded into a bottle by use of compressed air, as shown in Fig. 6, and is carried, after being disengaged from the portions 15 and 7, to a discharge station and there released by opening the neck portion 8, as shown in Fig. 8, where a carrier 18, moved by a rotating part 17, receives the bottle as the same is released.

The container 1 is heated by a burner 19, delivering the flame into a space 20, which extends beneath the container, which arrangement produces a constant addition of heat units to the glass that is advancing through to the container 1, which is externally reinforced by a metallic casing 21. The mold members 6 and 7 are preferably opened and closed by the engagement of the rack 14 with the gear portion 13. However, any suitable arrangement for this purpose may be used. The neck forming portion 8 of the mold is preferably opened and closed by a cam located above the supporting section 22. The air for blowing the blank is conducted to pipe 10 and blow-pipe 9 to the neck of the blank, and during the blowing operation, as the blank is centralized within the blow-mold, the blow-pipe 9 is caused to descend into the body of the blank by the movement of the crank arrangement 12, which may be caused at this instant by any suitable mechanical contrivance.

Having thus briefly described the process, I do not wish to be limited to the exact embodiments and means therein shown, which means are more fully described in my Patent No. 1,328,273, aforementioned, and for this reason I will emphasize that the process consists, so to speak, in the novel procedure of combining a continuous discharge movement of glass with an intermittent discharge of a mold-charging quantity, which is caused to be recurrently or intermittently released and delivered in one single advance, and which is bodily detached while in a state of motion, both of departure from its source of supply by the force of discharge and by other force of actuation. It further should be noted that the glass is caused to advance in a pulsatile fashion by the intermittent action of accelerating and retarding forces upon the discharge movement thereof, and that the mechanisms employed in a transitional sense act to cause a movement of departure of discharging glass from its source of supply that is in harmony with, and in fact determines the speed of movement of the glass from the supply.

Certain features of the invention herein disclosed and not claimed are made the subject-matter of claims in my copending application, Serial No. 679,236, filed February 23, 1912.

Having thus described my invention, what I claim is:

1. The process of obtaining mold charges from a supply of molten glass comprising causing glass to issue continuously from a discharge orifice in a stream of periodically increasing and decreasing velocity, shearing a mold charge from each portion discharged with increased velocity, and moving the shear with the said charge during severance.

2. The process of obtaining mold charges from a supply of molten glass comprising causing glass to issue from an upwardly directed discharge orifice in a stream of periodically increasing and decreasing velocity, shearing a mold charge from each portion discharged with increased velocity, and moving the shear with the said charge during severance.

3. The process of obtaining mold charges from a supply of molten glass comprising causing glass to issue continuously from a discharge orifice in a stream of periodically increasing and decreasing velocity having a cross section substantially the same as the mold cavities to be filled, shearing a mold charge from each portion discharged at increased velocity, and moving the shear with the said charge during severance.

4. The process of obtaining mold charges from a supply of molten glass comprising causing glass to issue from an upwardly directed discharge orifice in a stream of periodically increasing and decreasing velocity, moving the glass laterally as it issues, shearing a mold charge from each portion discharged at increased velocity, and moving the shear with the said charge during severance.

5. In glass manufacture the process comprising passing molten glass continuously through a discharge orifice, moving the glass laterally as it discharges, and severing mold charges from the laterally moving glass.

6. In glass manufacture the process comprising passing molten glass continuously through an upwardly discharging orifice, moving the glass laterally as it issues, and severing mold charges from the laterally moving glass.

7. In glass manufacture the process comprising passing glass continuously through an upwardly discharging orifice, passing molds successively over the orifice, allowing unrestricted flow of glass to fill each mold as it passes over the orifice, and restricting the flow when no mold is over the orifice.

8. The process of obtaining mold charges from a supply of molten glass comprising passing glass from the supply through a discharge orifice, periodically increasing and decreasing the flow of glass without at any time closing the orifice, shearing mold charges from the issued glass in timed relation to the increase and decrease of flow, and moving the shear with said charge during severance.

9. In glass manufacturing, the method which consists in effecting a movement of departure of molten glass from a supply, cutting off from the departing glass with mechanism, a portion of the departing glass to produce a mold charge, and causing the mechanism and the remaining portion of departing glass from which a charge has been severed, to move in the same general direction while simultaneously imparting an independent movement of departure to the said mold charge relative to the said remaining portion of glass.

10. The method which consists in causing molten glass to issue from a source of supply, periodically cutting off mold charges from the issuing glass with cutting devices, and causing after each cutting operation, a continued issuance of glass and movement of the issuing glass and cutting device in the same general direction, and simultaneously imparting a separate movement of the severed charge away from the point of discharge in a different direction.

ENOCH FERNGREN.